United States Patent [19]

Shindou et al.

[11] Patent Number: 5,559,931
[45] Date of Patent: Sep. 24, 1996

[54] COMPRESSION/DECOMPRESSION SYSTEM WHICH PERFORMS AN ORTHOGONAL TRANSFORMATION IN A TIME DIRECTION WITH RESPECT TO PICTURE PLANES

[75] Inventors: Tomoyuki Shindou, Yamato; Seiji Higurashi, Tokyo-To, both of Japan

[73] Assignee: Victor Company of Japan, Ltd., Yokohama, Japan

[21] Appl. No.: 141,676

[22] Filed: Oct. 27, 1993

[30] Foreign Application Priority Data

Oct. 27, 1992 [JP] Japan .................... 4-311172

[51] Int. Cl.$^6$ ................................ H04N 7/137
[52] U.S. Cl. ........................... 395/105; 395/114
[58] Field of Search ..................... 395/101, 105, 395/109, 114; 358/401, 402, 403, 407, 408, 412, 420

[56] References Cited

U.S. PATENT DOCUMENTS

| | | | |
|---|---|---|---|
| 4,933,763 | 6/1990 | Chantelou | 358/136 |
| 4,999,705 | 3/1991 | Puri | 358/136 |
| 5,268,755 | 12/1993 | Nishino et al. | 358/409 |
| 5,315,326 | 5/1994 | Sugiyama | 348/415 |
| 5,317,397 | 5/1994 | Odaka et al. | 348/416 |
| 5,347,309 | 9/1994 | Takahashi | 348/401 |
| 5,351,083 | 9/1994 | Tsukagoshi | 348/384 |

FOREIGN PATENT DOCUMENTS 0405842  1/1991  European Pat. Off. ......... H04N 7/13

OTHER PUBLICATIONS

The Journal of the Institute of Television Engineers of Japan, vol. 42, No. 11, Nov. 1988.

*Primary Examiner*—Raymond J. Bayerl
*Assistant Examiner*—Gabriel I. Garcia
*Attorney, Agent, or Firm*—Jacobson, Price, Holman & Stern, PLLC

[57] ABSTRACT

A compression/decompression system for an image data performs a motion compensated prediction and an orthogonal transformation in a time-direction with respect to a plurality of picture planes by combining one pair of an A-frame and a B-frame. The system has a motion estimation element for obtaining a motion vector signal with respect to the A-frame from a first block signal, a motion prediction element for outputting a third block signal obtained by performing a motion compensated prediction with respect to the A-frame on the basis of the motion vector signal, and an orthogonal transformation element for outputting a first and second transformed information obtained by performing an orthogonal transformation in the time-direction with respect to a plurality of picture planes on the basis of the first and third block signals.

7 Claims, 10 Drawing Sheets

FIG. 4A  aa  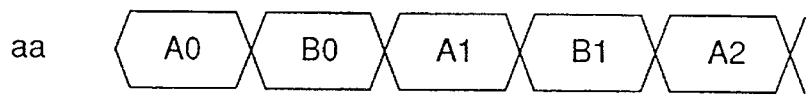

FIG. 5A

| a00 | a01 | --- | a0n |
|---|---|---|---|
| a10 | a11 | --- | a1n |
| ⋮ | ⋮ | ⋱ | ⋮ |
| am0 | am1 | --- | amn |

| 22 | 23 | 24 | 25 |
| 32 | 33 | 34 | 35 |
| 42 | 43 | 44 | 45 |
| 52 | 53 | 54 | 55 |

FIG. 6B

| 22t | 23t | 24t | 25t |
| 32t | 33t | 34t | 35t |
| 42t | 43t | 44t | 45t |
| 52t | 53t | 54t | 55t |

FIG. 6C

| 11 | 12 | 13 | 14 | 15 | 16 | 17 | 18 |
| 21 | 22t | 23t | 24t | 25t | 26 | 27 | 28 |
| 31 | 32t | 33t | 34t | 35t | 36 | 37 | 38 |
| 41 | 42t | 43t | 44t | 45t | 46 | 47 | 48 |
| 51 | 52t | 53t | 54t | 55t |    |    |    | a00, a01

FIG. 6D

| 15 | 16 | 17 | 18 |
| 25t | 26 | 27 | 28 |
| 35t | 36 | 37 | 38 |
| 45t | 46 | 47 | 48 |

FIG. 6E

| 11 | 12 | 13 | 14 | 15t | 16t | 17t | 18t |
| 21 | 22t | 23t | 24t | 25tt | 26t | 27t | 28t |
| 31 | 32t | 33t | 34t | 35tt | 36t | 37t | 38t |
| 41 | 42t | 43t | 44t | 45tt | 46t | 47t | 48t |

COMPRESSION/DECOMPRESSION SYSTEM WHICH PERFORMS AN ORTHOGONAL TRANSFORMATION IN A TIME DIRECTION WITH RESPECT TO PICTURE PLANES

BACKGROUND OF THE INVENTION

The present invention relates to a compression system, a decompression system and compression/decompression system for compressing, decompressing and compressing/decompressing image data.

There is conventionally performed a three-dimensional orthogonal transformation (hereinafter refer as to a "DCT"—a discrete cosine transformation—corresponding to a necessity) in order to reduce redundancies in image signals, with respect to not only a direction-in-plane but also a time direction. In the three-dimensional DCTs, a DCT is performed with respect to pixels as an object which are the same positions as a two-dimension in an image plane and have discrepancies in time base.

Furthermore, there is conventionally provided a compression system for reducing redundancies in the time direction by combining a motion prediction and a two-dimension DCT, for example, a system which is used in a television conference/telephone system having "n×384 kb/sCODEC" and the like (refer to pp. 1219–1225, Vol. 42, No. 11, in "A trend of international standardization of a television conference/telephone system" of the bulletin of Japanese television society).

There will be described this system in accordance with a block diagram shown in FIG. 1. An outline of the system is that an in-plane discrete cosine transformer 4 codes a predictive error signal 1a capable of representing the difference between an input image signal aa and a predictive image signal 12a which is generated in accordance with a detected result of a motion vector.

In FIG. 1, the input image signal aa is supplied to a motion estimation means 11 to output to a motion prediction means 12 a motion vector signal 11a which is obtained by comparing the input image signal aa with a memory output signal 10a corresponding to the input image signal of a previous one frame. In this specification, one frame means one picture plane which is a concept including one field and one frame in interlaced scanning.

The motion prediction means 12 generates a predictive image signal 12a which is predicted from the memory output signal 10a on the basis of the motion vector signal 12a, and a subtracter 1 subtracts the predictive image signal 12a from the input image signal aa to obtain a predictive error signal la which is supplied to a prediction discrimination means 2 and a first selection means 3.

The prediction discrimination means 2 discriminates as to whether or not the prediction is effective by comparing an information amount of the input image signal aa with that of the prediction error signal 1a, namely, the means 2 discriminates that the prediction is effective when the information amount of the prediction error signal 1a is less than the information amount of the input image signal aa, and that the prediction is ineffective when the information amount of the prediction error signal 1a is more than the information amount of the input image signal aa. The first selection means 3 and a second selection means 9 operate on the basis of the discriminated result. Namely, the first selection means 3 selects the predictive error signal 1a when the prediction is effective, while the means 3 selects the input image signal aa when the prediction is ineffective, thereby supplying any of the signals 1a and aa to the discrete cosine transformer 4. The second selection means 9 selects the prediction image signal 12a when the prediction is effective, thereby supplying it to an addition means 8 described later.

A signal performed a two-dimension DCT by discrete cosine transformer 4, is quantized again by a quantization means 5 to supply to a coding means (not shown) an output image signal bb of which an information amount is compressed. The output image signal bb is decoded by an inverse quantization means 6 and an inverse discrete cosine transformer 7 constituting a local decoder to generate a signal corresponding to the prediction error signal 1a which is added by the addition means 8 with the prediction image signal 12a obtained through the second selection means 9, thereby obtaining a decoded signal 8a corresponding to the input image signal aa. The decoded signal 8a is supplied to a memory means 10 to obtain the memory output signal 10a which is delayed with one frame.

By this, in the compression system combining the motion prediction with the two-dimension DCT for reducing the redundancies in the time direction, the two dimension DCT is performed with the prediction error signal 1a, and requantization is performed to reduce the information amount. At the same time, by using the local decoder, the prediction image signal 12a is generated on the basis of the decoded signal 8a including quantization errors in order to avoid an accumulation of the quantization errors occurring in the requantization.

However, in the three-dimension DCT as described above, since the DCT is performed with pixels (as an object) which are positioned at the two-dimensional position on the picture plane and have discrepancies in the time base, when the object in the input image moves, the correlation in the time direction disappears, thereby resulting the problem that it is impossible to reduce the redundancies.

On the other hand, in the case where the motion prediction is combined with the two-dimension DCT, even though the object in the input image moves, it is possible to reduce the redundancies because the motion prediction means intensifies the correlation in the time direction. However, in this case, it is necessary to provide the local decoder, thereby resulting the problem that both of a calculation amount and a circuit scale become larger.

SUMMARY OF THE INVENTION

In order to eliminate the above problems, an objective of the present invention is to provide a compression system, a decompression system and a compression/decompression system for image data, which are capable of reducing redundancies by maintaining a correlation in the time direction even in the three-dimension DCT when the object in an input image moves.

Furthermore, another objective of the present invention is to provide a compression system, a decompression system and a compression/decompression system for image data, which are capable of suppressing a calculation amount and a circuit scale and enabling needlessness of the local decoder even though the motion prediction is combined with the two-dimension DCT, when the object in the input image moves.

In order to eliminate the above objectives, the present invention has the following constitution:

A compression system and/or compression/decompression system for image data, which perform or performs an orthogonal transformation in a time direction with respect to a plurality of picture planes with one pair of a reference plane and other plane(s) on or more than one with performing a motion compensation prediction, comprises motion estimation means for obtaining motion information with respect to the other plane(s), motion prediction means for outputting predictive image information of or more than one obtained by performed motion compensation prediction to the other plane(s) on the basis of the motion information, and orthogonal transformation means for outputting transformed information obtained by performing an orthogonal transformation in a time direction with respect to the plurality of planes on the basis of the image information of the reference plane and the predictive image information of or more than one.

A decompression system and/or compression/decompression system for image data and which receive or receives output information outputted from the compression system and/or compression/decompression system mentioned above, comprises decoding means for decoding the transformed information and the motion information from the output information, motion prediction means for performing a motion compensation prediction to predetermined information in the transformed information on the basis of the motion information, and inverse orthogonal transformation means for performing an inverse orthogonal transformation in the time direction with respect to the plurality of planes on the basis of output information of the motion prediction means and the other information in the transformed information.

A compression system and/or compression/decompression system for image data, which perform or performs an orthogonal transformation in a time direction with respect to each of predetermined blocks divided from a plane with performing a motion compensation prediction, as another aspect of the present invention, comprises motion estimation means for obtaining motion information with respect to each of the predetermined blocks the other plane(s), motion prediction means for outputting predictive image information of or more than one obtained by performed motion compensation prediction each of the blocks on the basis of the motion information, and orthogonal transformation means for outputting transformed information obtained by performing an orthogonal transformation in a time direction with respect to each of the blocks on the basis of the image information of the reference plane and the predictive image information of or more than one, wherein a portion of the transformed information is fed back to an input of the motion prediction means with respect to each of the blocks.

A decompression system and/or compression/decompression system for image data and which receive or receives output information outputted from the compression system and/or compression/decompression system immediately mentioned above, comprises decoding means for decoding the transformed information and the motion information from the output information, motion prediction means for performing a motion compensation prediction to predetermined information in the transformed information on the basis of the motion information, and inverse orthogonal transformation means for performing an inverse orthogonal transformation in the time direction with respect to each of the blocks on the basis of output information of the motion prediction means and the other information in the transformed information, wherein a portion of the image information is fed back to an input of the motion prediction means in the inverse order at compression with respect to each of the blocks.

According to the constitution of the compression system for image information of the present invention, since the orthogonal transformation means is provided for outputting the transformed information which is obtained by performing an orthogonal transformation in the time direction with respect to a plurality of the planes on the basis of the image information of the reference plane and the predictive image information of or more than one, it is possible to increase a correlation of input information of the orthogonal transformation means, and also possible to reduce redundancies with respect to moving pictures in which redundancies can not be reduced by the conventional image data compression system using a three-dimension DCT. Furthermore, even though the other conventional compression system combining the motion prediction with the two-dimension DCT needs to be provided a local decoder for avoiding an accumulation of quantization errors occurring at a requantization and for reducing an amount of information by performing a two-dimension DCT and re-quantization with the predictive error signal, it is possible for the present invention to enable the local decoder to be unnecessary and to reduce a calculation amount and circuit elements, because the system of this invention performs an orthogonal transformation in the time direction with respect to a plurality of the planes corresponding to one pair of the reference plane and the other plane of or more than one.

Furthermore, according to the decompression system of the present invention mentioned above, since the inverse transformation is performed in the time direction with respect to a plurality of the planes on the basis of the output information of the motion prediction means and the other information in the transformed information, it is possible to perfectly restore the output information to the input image data.

Still furthermore, according to the compression system of one aspect of the present invention mentioned above, since there is fed back to the input of the motion prediction means the portion of the transformed information obtained by performing an orthogonal transformation to each predetermined block in the time direction with respect to a plurality of planes on the basis of the image data of the reference plane and the predictive image information of or more than one, tile local decoder can be eliminated with a simple constitution and without an increase of the information amount.

Moreover, according to the compression system of the present invention having the constitution mentioned above, since the portion of the image data is fed back to the input of the motion prediction means in the inverse order at a compression with respect to each predetermined block, it is possible to perfectly restore the output information to the input image data.

BRIEF DESCRIPTION OF THE DRAWINGS

In the accompanying drawings:

FIGS. 4A–4H are timing charts showing operation of the time direction conversion means shown in FIG. 3;

FIGS. 5A–5D are conceptual diagrams showing operation of the time direction conversion means shown in FIG. 3;

FIGS. 6A–6E are conceptual diagrams showing operation of the time direction conversion means shown in FIG. 3;

DETAILED DESCRIPTION OF THE PREFERRED EMBODIMENTS

There will be described in detail preferred embodiments of the present invention in reference with the attached drawings.

Figure 1:
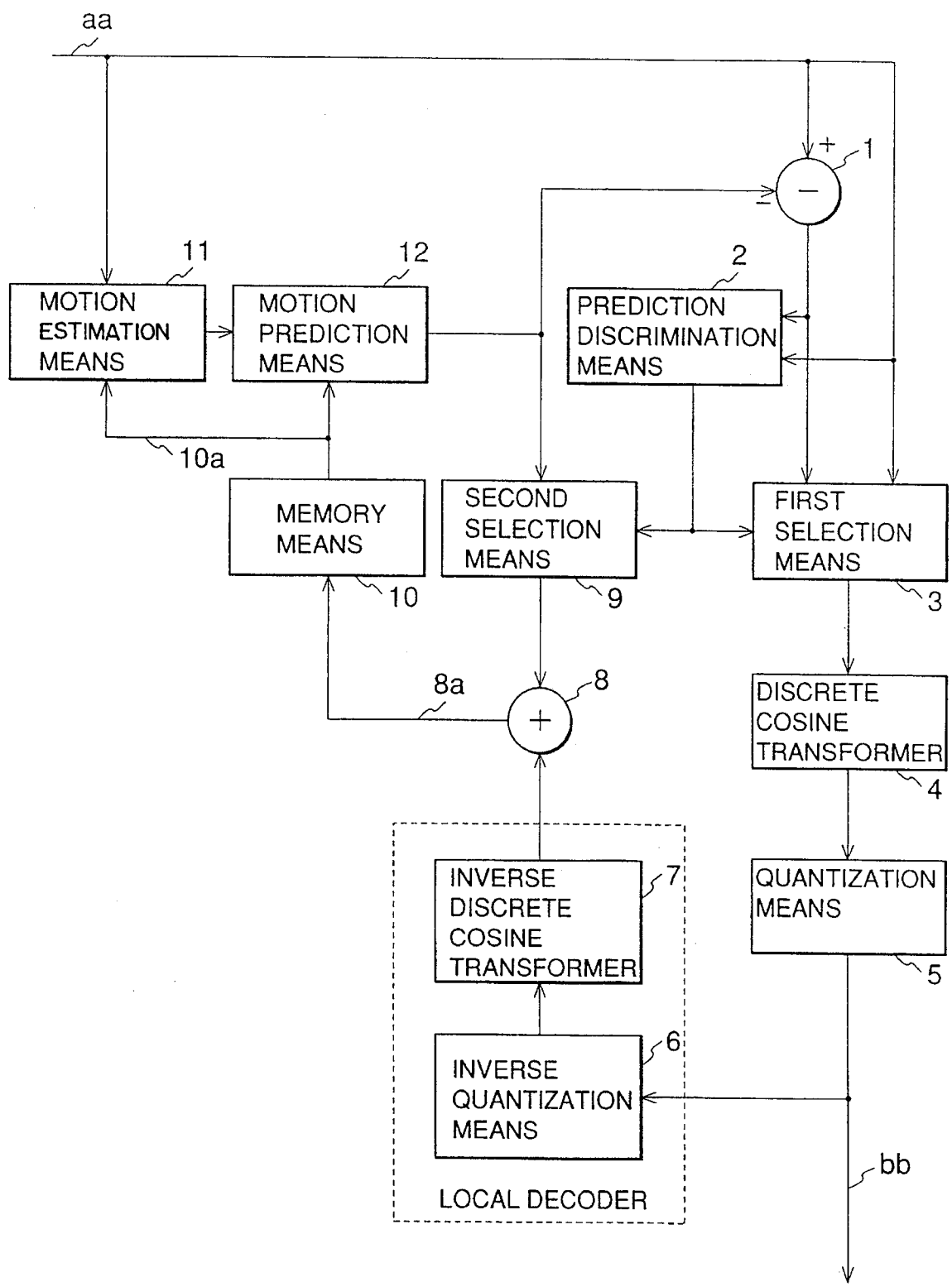
FIG. 1 is a block diagram for explaining the conventional technique.
Figure 2:
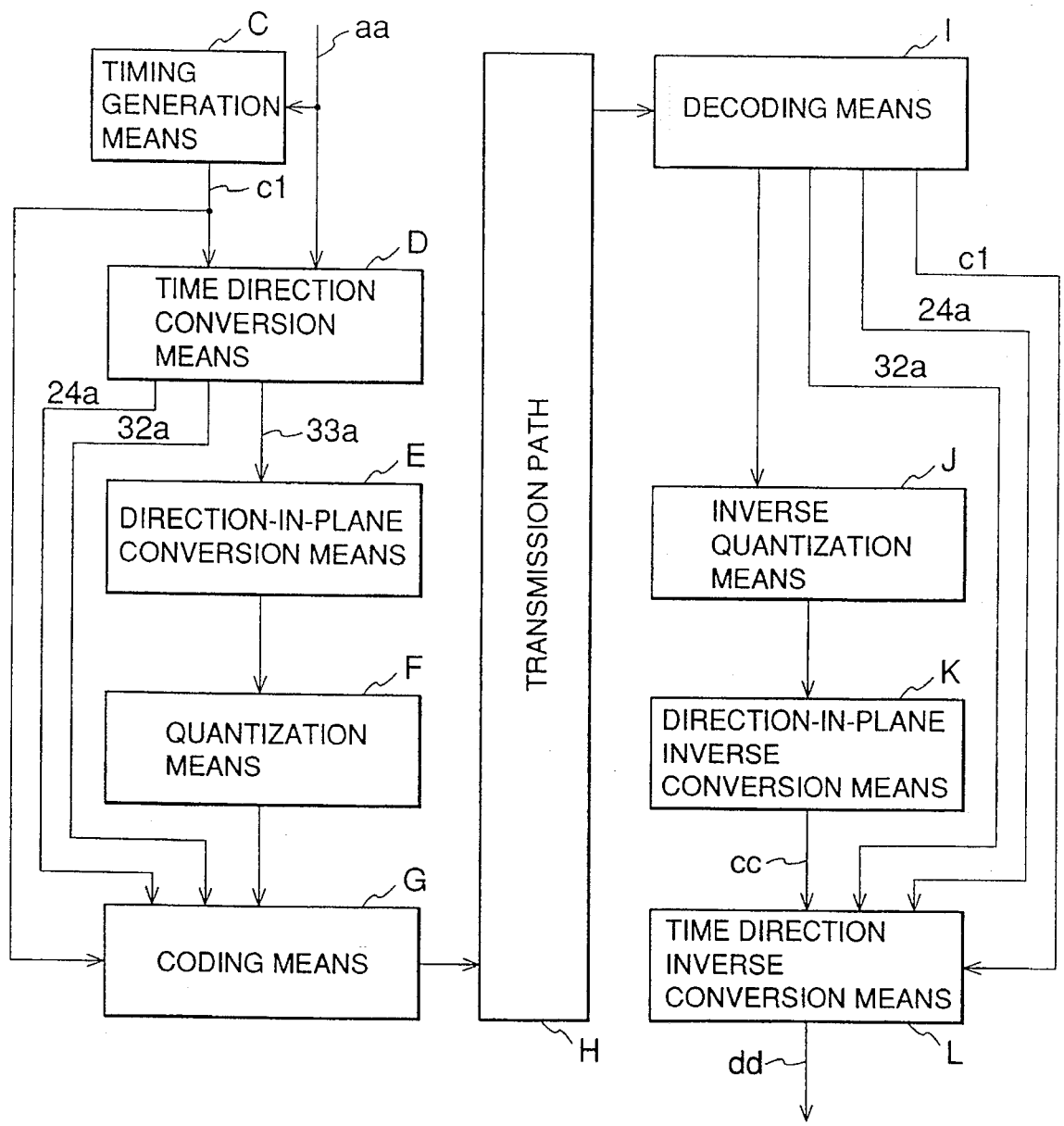
FIG. 2 is a block diagram showing a compression/decompression system for image data according to a first embodiment of the present invention.
Figure 3:
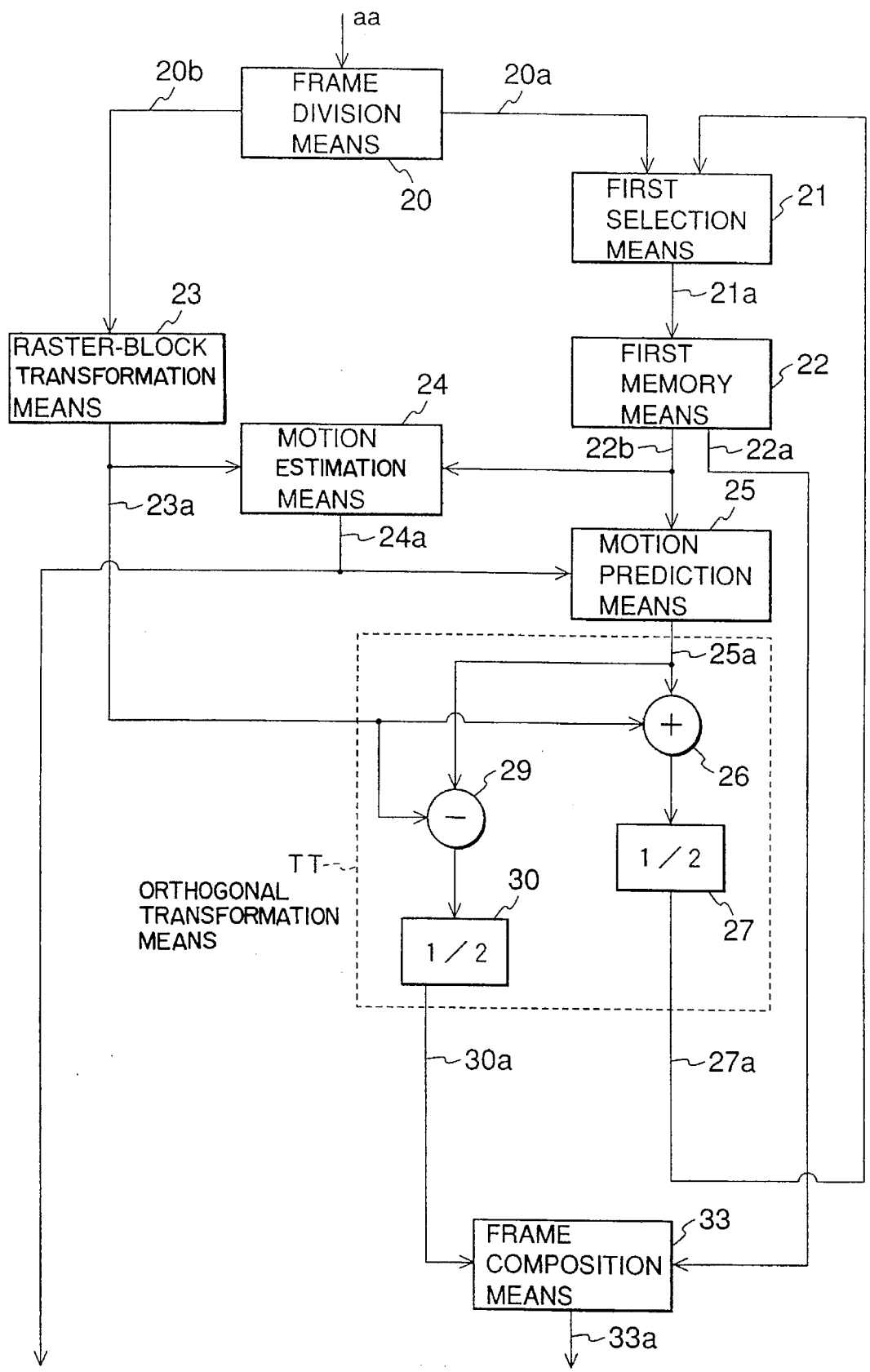
FIG. 3 is a block diagram showing time direction conversion means.
Figure 7:
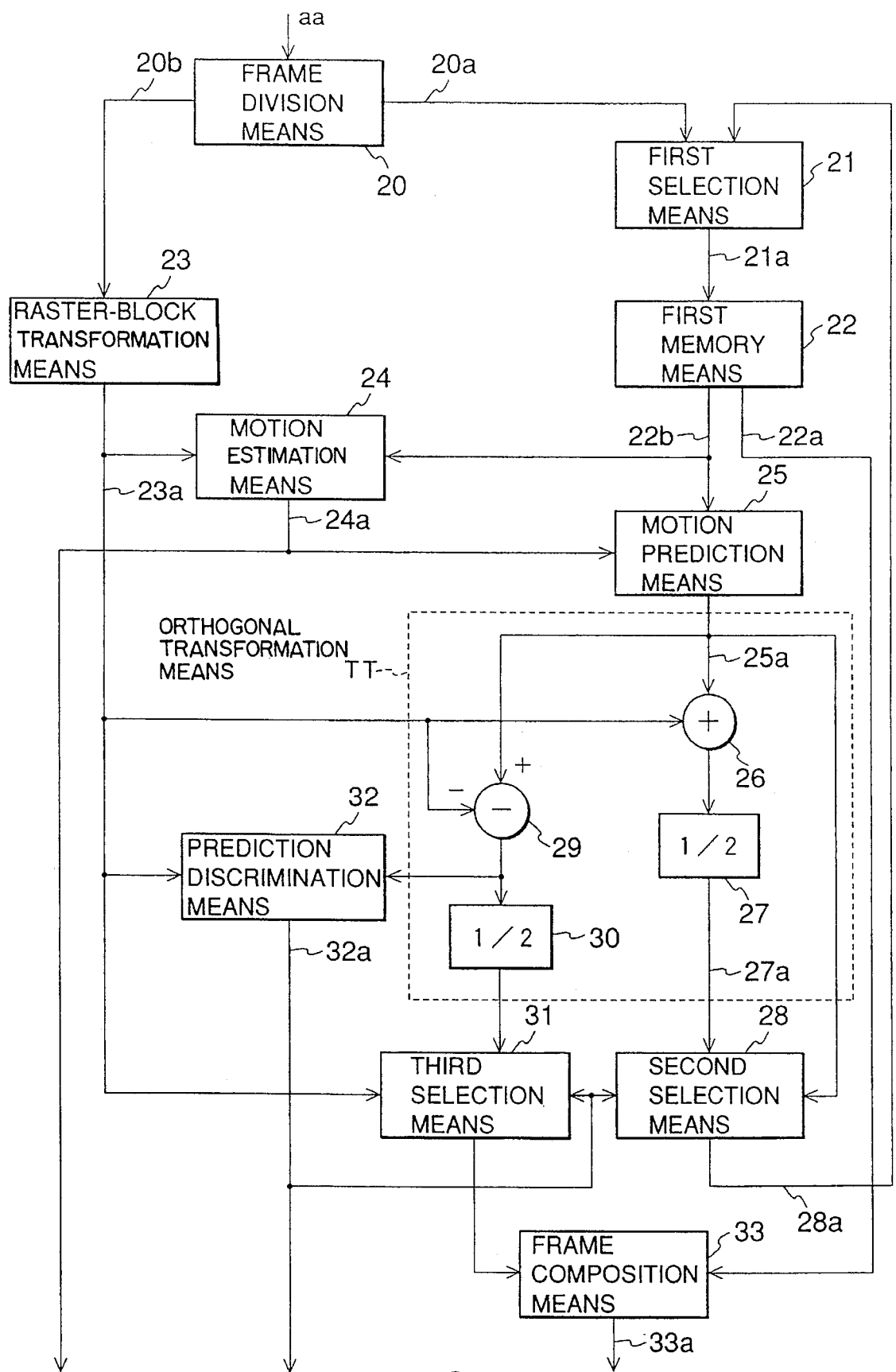
FIG. 7 is a block diagram showing other time direction conversion means different from that in FIG. 3.
Figure 8:
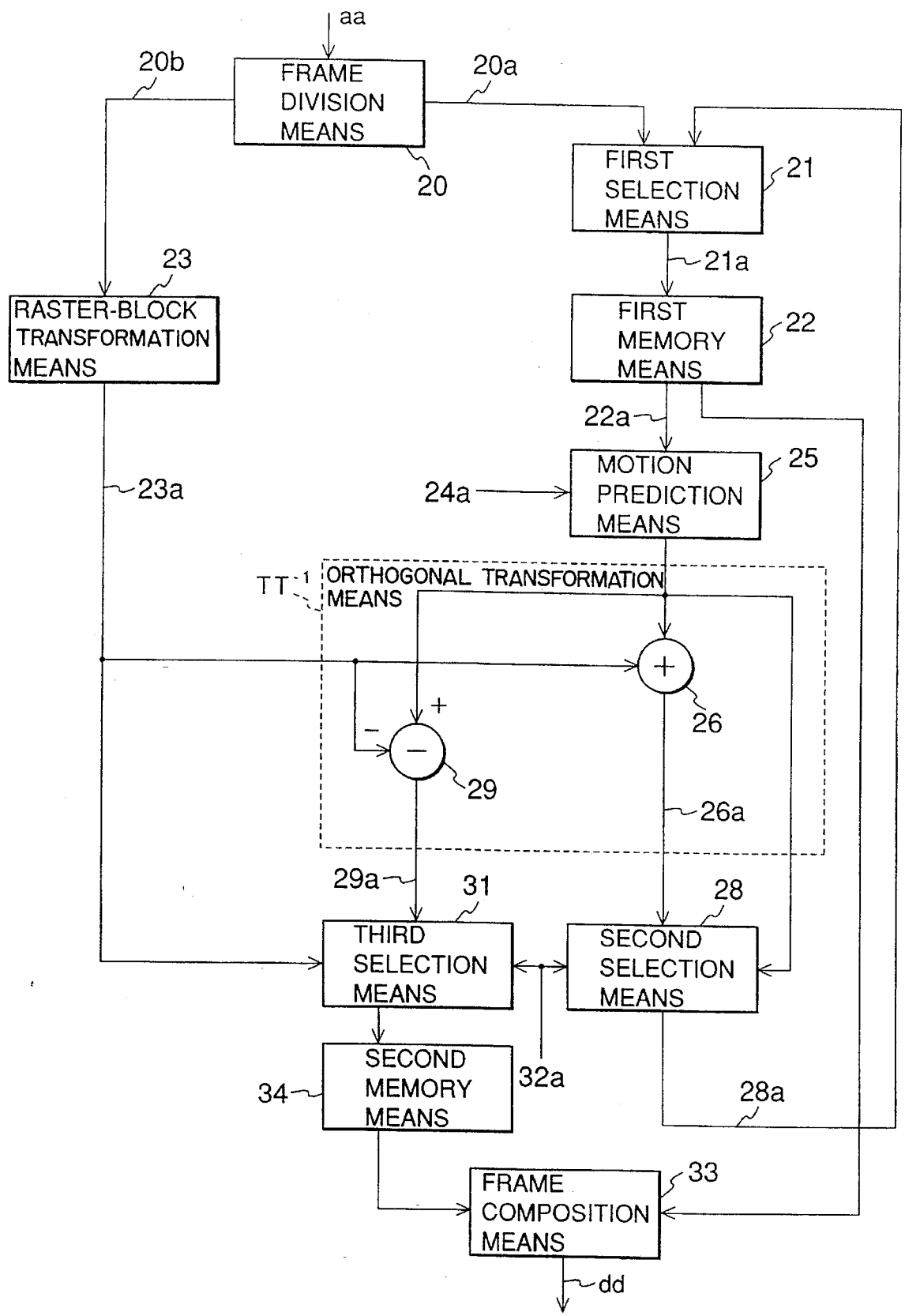
FIG. 8 is a block diagram showing time direction inverse conversion means.
Figure 10:
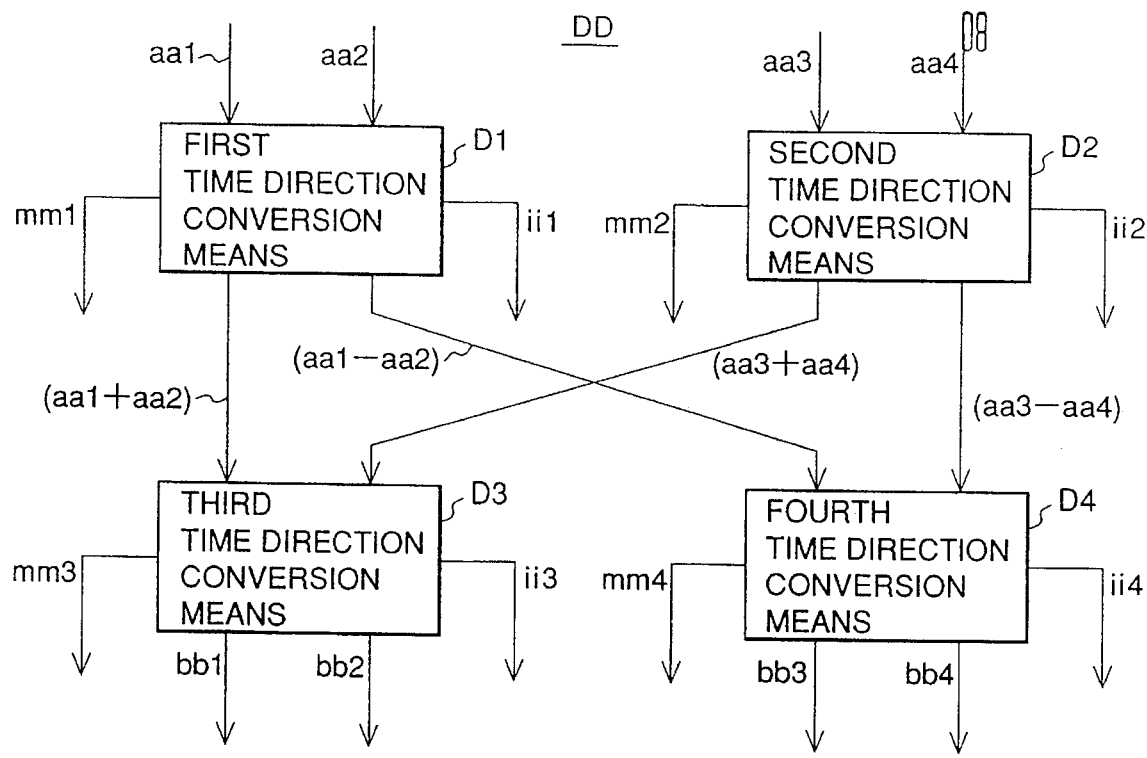
FIG. 10 is a block diagram showing time direction conversion means according to a second embodiment of the present invention.
Figure 11:
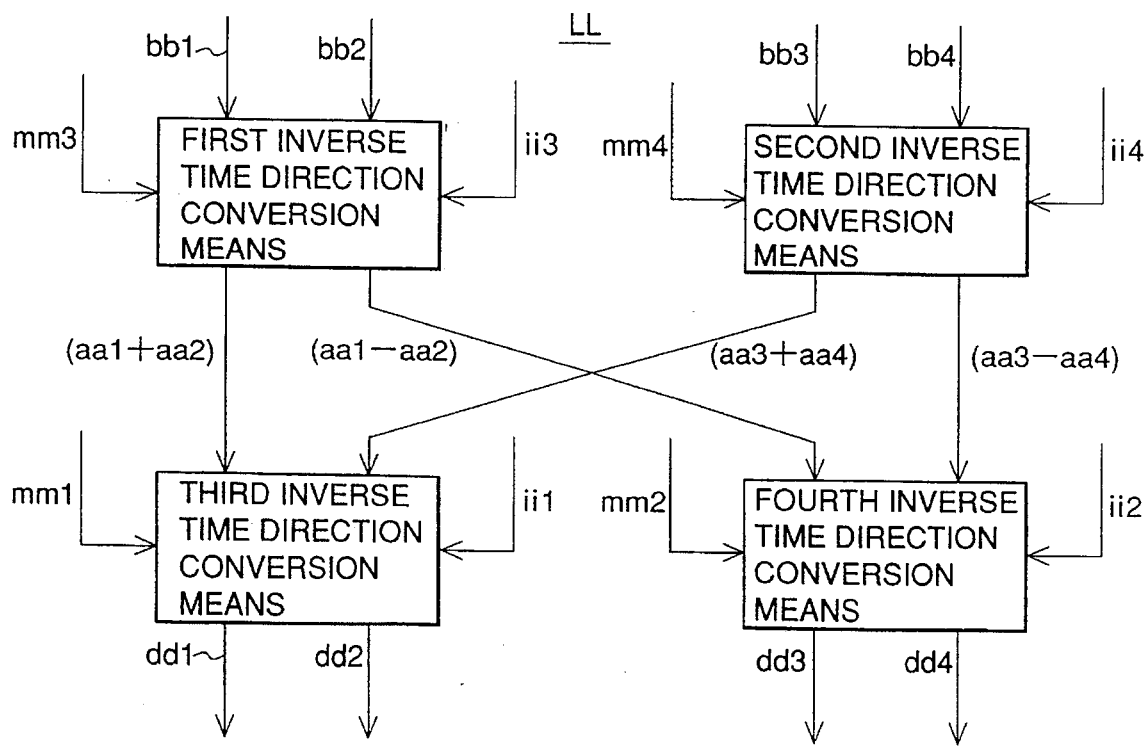
FIG. 11 is a block diagram showing time direction inverse conversion means according to the second embodiment of the present invention.

FIG. 2 is a block diagram showing a compression/decompression system for image data according to a first embodiment of the present invention. FIG. 3 is a block diagram showing time direction conversion means. FIGS. 4A–4H are timing charts showing operation of the time direction conversion means shown in FIG. 3. FIGS. 5A–5D are conceptual diagrams showing operation of the time direction conversion means shown in FIG. 3. FIGS. 6A–6E are conceptual diagrams showing operation of the time direction conversion means shown in FIG. 3. FIG. 7 is a block diagram showing other time direction conversion means different from that in FIG. 3. FIG. 8 is a block diagram showing time direction inverse conversion means. FIGS. 9A–9H timing charts showing operation of the time direction conversion means shown in FIG. 8. FIG. 10 is a block diagram showing time direction conversion means according to a second embodiment of the present invention. And FIG. 11 is a block diagram showing time direction inverse conversion means according to the second embodiment of the present invention. In the following description, an odd numbered frame is called as an A-frame and an even numbered frame is call as a B-frame which are constituted from an input image signal aa that is continuously supplied.

THE FIRST EMBODIMENT:

FIG. 2 shows an entire configuration of a compression/decompression system according to the first embodiment. At first, a transmission side is configured from timing generation means C, time direction conversion means D, in-plane direction conversion means E, quantization means F and coding means G. The timing generation means C receives the input image signal aa supplied through a transmission path (not shown) so as to generate a control signal c1 for controlling a discrimination of the A- and B-frames from a vertical synchronous signal included in the input image signal. The time direction conversion means D also receives the input image signal aa and the control signal c1 and performs an orthogonal transformation in the time direction such as an Hadamard Transformation, DCT and the like to the input image signal aa by using a motion vector so as to reduce redundancies with respect to a plurality of planes. The in-plane direction conversion means E performs an orthogonal transformation or other transformation using a time division such as a sub-band, wavelet and the like so as to reduce redundancies in one picture plane. The quantization means F performs a linear re-quantization or a non-linear re-quantization to reduce an information amount. The coding means G performs coding such as a run length coding, Huffman coding or arithmetic coding and the like with respect to a quantized result to supply a coding result to a transmission path H. The transmission path H is configured from, for example, a telephone line, optical disk and the like, and when the compression/decompression system is a video tape recorder (VTR), the transmission path H corresponds to a tape head system.

There is described a reception side which is complementarily concerned with the transmission side. The reception side comprises decoding means I, inverse quantization means J, in-plane direction inverse transformation means K, and time direction inverse transformation means L. A signal including the coding result is supplied the decoding means I to output a decoded signal which is supplied to the time direction inverse transformation means L through the inverse quantization means J and the in-plane direction inverse transformation means K. The time direction inverse transformation means L outputs to a transmission line (not shown) an output image signal dd which is obtained by performing an inverse orthogonal transformation in the time direction with a signal cc outputted from the transformation means K on the basis of the control signal c1 of A- and B-frames, a motion vector signal 24a and a prediction discrimination signal 32a which are outputted from the coding means I.

Here, the time direction conversion means D as a gist of the present invention will be described mainly based on FIG. 3 and with reference to FIGS. 4A through 6E. In FIG. 3, the input image signal aa (shown in FIG. 4A) is supplied to a frame division means 20 which divides (distributes) the signal aa into a signal 20a (shown in FIG. 4B) about the A-frame (the odd numbered frame) and a signal 20b (shown in FIG. 4C) about the B-frame (the even numbered frame). The signal 20a is supplied to one input of a first selection means 21 and the signal 20b is supplied to a raster-block conversion means 23. In FIGS. 4A–4H, symbols "A" and "B" denote "relating the A-frame and B-frame", respectively, "0", "1" and "2" denote the first, second and third A- or B-frames, "t" denotes "including data performed by a DCT", "m" denotes "performing a motion prediction", and "k" denotes the final output.

The first selection means 21 mutually selects the signal 20a and a first transformed output signal 27a supplied from orthogonal transformation means TT mentioned later at each one frame to output a signal 21a shown in FIG. 4D to a first memory means 22.

Figure 4B:
Figure 4C:
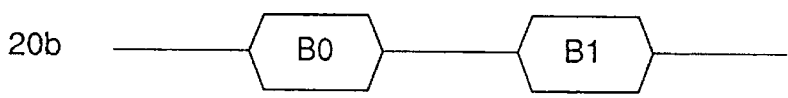
Figure 4D:
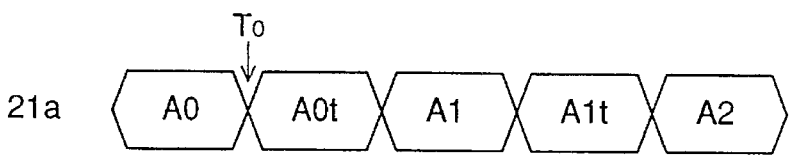
Figure 4E:
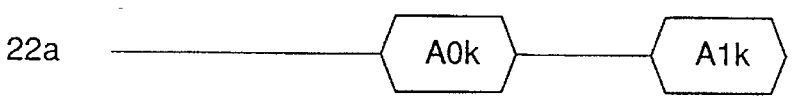
Figure 4F:
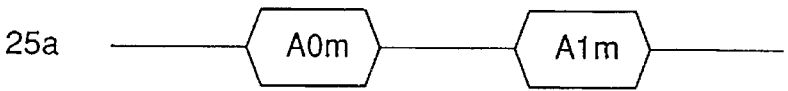
Figure 4G:
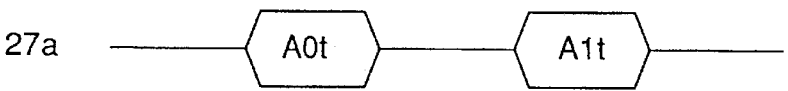

Processing of a block unit is performed after T0 shown in FIG. 4D, namely, after completing writing for an A0-frame. A condition of the first memory 22 at the time of T0 is that blocks from a00 to amn are written in predetermined regions, respectively, as shown in FIG. 5A, and processing is performed in the order of a00, a01, ..., a0n, a10, ..., a1n, ..., am0, am1, ..., amn. FIG. 5B shows the blocks a00 and a01 in detail.

There is described in detail processing with respect to the blocks a00 and a01. The raster-block transformation means 23 divides the signal 20b about the B-frame into a block unit of "vertical 4 pixels×horizontal 4 pixels" to obtain a first block signal 23a so as to supply it to one input of a motion estimation means 24. At this time, FIG. 5C shows a block b00 of a B0-frame corresponding to a block a00 of an A0-frame.

To another input of the motion estimation means 24, there is supplied from the first memory means 22 a second block signal 22b corresponding to a block (having such as "vertical 8 pixels×horizontal 8 pixels") with respect to the A0-frame being larger than the block b00 with respect to the first block signal 23a. The motion estimation means 24 compares the signals 22b with 23a to obtain and supply a vector signal 24a to motion prediction means 25 and decoding means G provided in later stage. Namely, the second block signal 22b to be compared, as shown in FIG. 5D, becomes the blocks a00, a01, a10 and a11, and the block b00 is compared with entire blocks of vertical 4 pixels×horizontal 4 pixels which are taken out within a range of the blocks a00, a01, a10 and a11, so as to obtain a motion vector signal 24a by searching a block having the most approximate value. Here, the block shown by dotted-lines in FIG. 5D is supposed as the block having most approximate value.

The motion prediction means 25 performs a motion prediction with respect to the second block signal 22b by using the motion vector signal 24a to obtain prediction image information. Namely, a third block signal 25a having a block unit as the same size as that of the first block signal 23a is obtained and supplied to addition means 26 and subtraction means 29 both provided in the orthogonal transformation means TT in the description detailed. Here, the third block signal 25a corresponds to a block shown in FIG. 6A.

The orthogonal transformation means TT performs an Hadamard transformation as a metamorphosis of an orthogonal transformation in which coefficients in coefficient setting means 27 and 30 are set to "½". An Hadamard transformation can extend to an orthogonal transformation mentioned later. The addition means 26 adds the first block signal 23a with the third block signal 25a to obtain a first transformed signal 27a through the coefficient setting means 27a, while the subtraction means 29 subtracts the first block signal 23a from the third block signal 25a to obtain a second transformed signal 30a through the coefficient setting means 30. FIG. 6B shows a block corresponding to the block a00 of the first transformed signal 27a.

Here, blocks corresponding to the first and second transformed signals are generally represented as symbols P and Q having "vertical Y pixels×horizontal X pixels", respectively, and blocks corresponding to the first and third block signals 23a and 25a are represented symbols S and R, respectively. Then, P and Q can be obtained by the following equations (1) and (2):

$$P[i][j]=(R[i][j]+S[i][j])/2 \quad (1)$$

$$Q[i][j]=(R[i][j]-S[i][j])/2 \quad (2)$$

where i=0, 1, ..., Y−1 and 0, 1, ..., X−1.

The second transformed signal 30a obtained by the above steps is supplied to one input of the frame composition means 33, the first transformed signal 27a according to a block unit is fed back to the first memory means 22 through the first selection means 21.

As a result, the block shown in FIG. 6B is written in the first memory means 22 again. A condition of the memory means 22 after completing rewriting is as shown FIG. 6C in that pixels encircled by a dotted line corresponding to pixels outputted from the motion prediction means 25 are rewritten, thereby completing processing with respect to the block a00.

Next, processing with respect to block a01 starts immediately after processing with respect to block a00. Here, if the motion vector is not detected (if it is estimated that there is no motion) with respect to the block a01, the third block signal 25a as an output signal of the motion prediction means 25 is one including 25t, 35t and 45t orthogonally transformed in the block a00 as shown in FIG. 6D. FIG. 6E shows a result that the first transformed signal 27a is obtained by performing an orthogonal with respect to the block a01, and is written in the first memory means 22 through the first selection means 21.

Figure 4H:

In the same manner as above, processing from the blocks a00 to amn is entirely performed, thereby completing processing for a pair from A0-frame to B0-frame as a unit. Another input of the frame composite means 33 receives a third transformed signal 22a which is treated by completing a frame unit processing for the first transformed signal 27a from the first memory means 22. The frame composite means 33 composes the second transformed signal 30a and the third transformed signal 22a so as to obtain a time direction converted signal 33a, as shown in FIG. 4H, which is supplied to the in-plane direction conversion means E (not shown in FIG. 3). The same processing is repeated in the succeeding frames.

In this manner, since the time-direction conversion means D performs an orthogonal transformation in the time direction between the block related to the B-frame and the block which is performed by a motion compensation prediction with respect to the block related to the A-frame, it is possible to reduce the redundancies even with respect to the input image signal aa about a moving picture.

There is now described an applying example of the time-direction conversion means D with reference to FIG. 7. The difference between FIGS. 3 and 7 is that prediction discrimination means 32 and second and third selection means are newly provided and a prediction discrimination signal 32a is supplied to the coding means G (not shown in FIG. 7). Namely, the prediction discrimination means 32 compares an output of the subtraction means 29 and the first block signal 23a at every blocks to discriminate a prediction accuracy of a motion compensated prediction performed in the motion prediction means 25. In detail, when an information amount of the first block signal 23a is on or more than an information amount of the output of the subtraction means 29, a motion compensated prediction is regarded as including a fault. In contrast, when the information amount of the first block signal 23a is less than the information amount of the output of the subtraction means 29, the motion compensated prediction is regarded as being accurate. The second and third selection means 28 and 31 operate in accordance with the discrimination result. When the motion compensated prediction is discriminated as being accurate, the second and third selection means 28 and 31 respectively output a first and second transformed signals 27a and 30a as they are. In contrast, when the motion compensated prediction is considered to be wrong, the second selection means 28 outputs the third block signal 25a as one input of the orthogonal transformation means TT with respect to the A-frame, and the third selection means 31 outputs the first block signal 23a as another input of the orthogonal transformation means TT with respect to the B-frame.

Accordingly, by this applying example, since operation jumps over the orthogonal transformation means TT when the motion compensated prediction is regarded to be wrong, rewriting the signal to the first memory means 22 is actually interrupted and the ordinal input image signal aa is outputted, thereby reducing the redundancies more and more.

Next, there is described time-direction inverse conversion means constituting a gist of the present invention, which has a complementary relationship with the time-direction conversion means D, with reference to FIGS. 8 and 9. The duplicated description of the same component in FIG. 7 will b omitted because of providing the same numerals. FIG. 9 is a timing chart showing the case where the motion compensated prediction is considered to be accurate in the time-direction conversion means D.

The difference between FIGS. 7 and 8 resides in that the motion estimation means 24, the prediction discrimination means 32 and the coefficient setting means 27 and 30 in FIG. 7 are omitted, and a second memory means 34 is provided between the third selection means 31 and the frame composition means 34. The reason why the motion estimation means 24 and the prediction discrimination means 32 are unnecessary, is that the decoding means I supplies the motion vector signal 24a and the prediction discrimination signal 32a.

In FIG. 8, an output signal cc (shown in FIG. 9A) supplied from the in-plane direction conversion means K (not shown in FIG. 8) is divided by the frame division means 20 into the signal 20a (shown in FIG. 9C) related to the first transformed signal 27a and the signal 20b (shown in FIG. 9B) related to the second transformed signal 30a.

The signal 20a is supplied to the first selection means 21 and the signal 20b is supplied to the raster-block transformation means 23, respectively. The first selection means 21 alternatively selects the signal 20a or the signal 28a related to a first decoded signal 26a, as shown in FIG. 9D.

Figure 9A:
FIGS. 9A–9H timing charts showing operation of the time direction conversion means shown in FIG. 8.
Figure 9B:
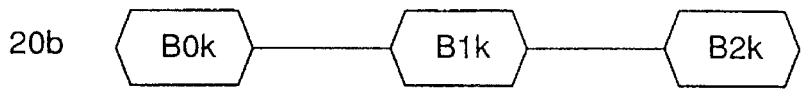
Figure 9C:
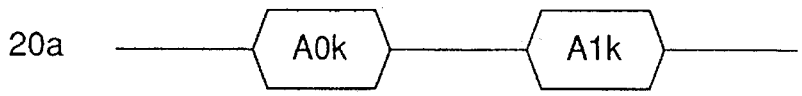
Figure 9D:
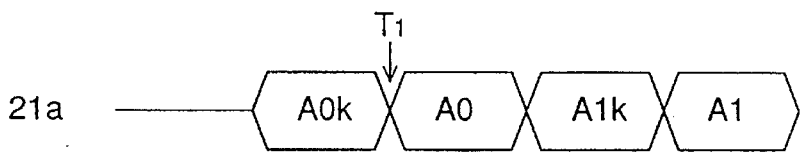
Figure 9E:
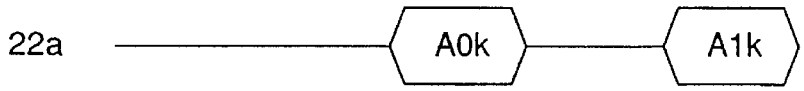
Figure 9F:
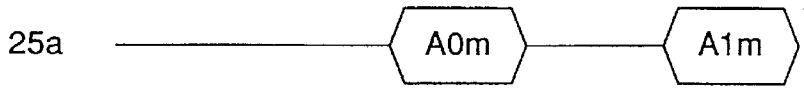
Figure 9G:
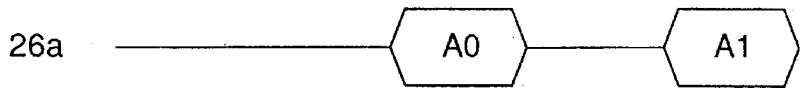
Figure 9H:

After completing rewriting of the A0k-frame, namely, after T1 shown in FIG. 9D, processing of the block unit is performed. Blocks a00-amn are written in predetermined regions in the first memory means 21 as the same manner of the transmission side as shown in FIG. 5A, and the motion compensated prediction and rewriting processing are performed in the same manner of the time-direction transformation means D in the inverse order to the transmission side, namely, in the order of amn, . . . , am1, am0, . . . , a12, a10, . . . , a01, a00, thereby completing processing of one unit of a pair of A0k-frame and B0k-frame and repeating the same operation.

In order to regulate a time of the second decoded signal 29a related to the B-frame with a time of the first decoded signal related to the A-frame, the second decoded signal 29a is supplied through the second memory means 34 to the frame composition means 33 which outputs a composed and obtained output image signal dd to a transmission line (not shown).

In the above manner, since the time-direction inverse conversion means L on the reception side performs block unit processing in the inverse order of the transmission side, it is possible to perfectly restore a pixel, for example, a pixel "25tt" as shown in FIG. 6E, which is repetitively performed in a plurality of times of a motion compensated prediction and an orthogonal transformation.

IN THE SECOND EMBODIMENT:

Even though an orthogonal transformation in the time direction between a motion prediction is performed in the first embodiment, a system according to a second embodiment performs a further compression/decompression by extending four frames. Therefore, the time-direction conversion means D in FIG. 2 is replaced by time-direction conversion means DD as shown in FIG. 10, and the time-direction inverse conversion means L in FIG. 2 is replaced by time-direction inverse conversion means LL as shown in FIG. 11.

The time-direction conversion means DD is described with reference to FIG. 10. Four frame division means (not shown in FIG. 10) divides the input image signal aa into first through fourth input image signals aa1–aa4. Here, when k is an integral number, the first input image signal aa1 is a signal related to a "4k"-th frame of the input image signal aa, the second input image signal aa2 is a "4k+1"-th frame, the third input image signal aa3 is a "4k+2"-th frame, and the fourth input image signal aa4 is a "4k+3"-th frame. First through fourth time-direction conversion means correspond to constitutions of which the frame division means 20 and the frame composition means 33 are respectively removed from the time-direction conversion means D.

The first time-direction conversion means D1 performs an orthogonal transformation in time-direction between two frames and using a motion prediction with respect to the first and second input image signals aa1 and aa2, thereby obtaining an output signals (aa1+aa2) with respect to an additional conversion component and an output signals (aa1−aa2) with respect to a subtracted conversion component. The time-direction conversion means D2 does an orthogonal transformation in time-direction between two frames and using a motion prediction with respect to the third and fourth input image signals aa3 and aa4, thereby obtaining an output signal (aa3+aa4) with respect to an additional conversion component and an output signal (aa3−aa4) with respect to a subtracted conversion component.

The time-direction conversion means D3 performs an orthogonal transformation with the additional conversion components to obtain first and second transformed signals bb1 and bb2, and the time-direction conversion means D4 performs an orthogonal transformation with the subtracted conversion components to obtain third and fourth transformed signals bb3 and bb4. The first through fourth transformed signals can be represented by the following equations (3) through (6):

$$bb1=(aa1+aa2+aa3+aa4)/4 \quad (3)$$

$$bb2=(aa1+aa2-aa3-aa4)/4 \quad (4)$$

$$bb3=(aa1-aa2+aa3-aa4)/4 \quad (5)$$

$$bb4=(aa1-aa2-aa3+aa4)/4 \quad (6)$$

where a motion compensation is not considered.

According to the equations (3) through (6), the time-direction conversion means DD performs fourth Hadamard transformations in the time-direction, and actually performs the fourth Hadamard transformations with performing a motion compensated prediction. By suitably setting coefficients in the coefficient setting means 30 and 27 in the first through fourth time-direction conversion means D1–D4, it is possible to perform a general orthogonal transformation.

The first through fourth transformed signals bb1–bb4 are composed by four-frame composition means (not shown) to compose signals as a result, which are supplied to the in-plane direction conversion means E of the later stage. The first through fourth time-direction conversion means D1–D4 respectively output first through fourth motion vector signals mm1–mm4 and first through fourth prediction discrimination signals ii1–ii4, which are supplied to the coding means G of the later stage.

There is described time-direction inverse conversion means LL which has the complementary relationship with the time-direction conversion means DD. The in-plane direction inverse conversion means K outputs a signal to four-frame division means (not shown) for dividing the signal into first through fourth conversion signals bb1–bb4. First through fourth time-direction inverse conversion means L1L4 have the respective constitution that the frame division means 20 and the frame composition means 33 are removed from the time-direction inverse conversion means L mentioned above.

The first-fourth time-direction inverse conversion means L1–L4 respectively perform an inverse conversion by using first through fourth motion vector signals mm1–mm4 and first through fourth prediction discrimination signals ii1–ii4 which are supplied from the decoding means I, thereby obtaining first through fourth output image signals dd1–dd4 each corresponding to the first through fourth input image signals aa1 through aa4. The four-frame composition means (not shown) composes the first through fourth output image signals dd1–dd4 to obtain the output image signal dd as the final output.

In the above manner, since the present invention can perform a motion compensated prediction and at the same time the fourth Hadamard transformation in the transmission side, it is possible to compress an information amount more than that in the mere time-direction fourth Hadamard transformation. Furthermore, since the equation (3) represents a time-direction integral, it is possible to further compress an information amount by the later-stage in-plane direction conversion means E, thereby obtaining a compression rate more extremely than the combination of the motion compensated prediction and the two-dimension DCT. Still furthermore, it is possible to perfectly restore the input image signal aa in the reception side.

Even though the system of the second embodiment extends from an intra-two-frame orthogonal transformation to an intra-four-frame orthogonal transformation with a motion compensated prediction by using four time-direction conversion means D in the first embodiment, it is possible for the present invention to extend from four frames to sixteen frames of an intra-frame orthogonal transformation by using the four time-direction conversion means DD in the manner of extending the first embodiment to the second embodiment. If the extension is repeated in a plurality of times, it is possible to extend the present invention to an intra-frame orthogonal transformation in $2^n$ frames.

Furthermore, it is possible to extend an orthogonal transformation by performing an orthogonal transformation between a plurality of predictive image information obtained by performing a motion prediction with respect to a plurality of A-frames (other pictures more than one) and image information with respect to B-frame (reference plane) by means of a plurality of constitutions from the first selection means 21 to motion prediction means with respect to A-frame. Furthermore, at this time, a portion of the transformed information as a result of an orthogonal transformation may be fed back to the input side of the prediction means.

What is claimed is:

1. A compression system and/or compression/decompression system for image data, which perform or performs an orthogonal transformation in a time direction with respect to a plurality of picture planes with one pair of a reference plane and other plane(s) with performing a motion compensation prediction, comprising motion estimation means for obtaining motion information with respect to the other plane and/or planes;

motion prediction means for outputting predictive image data obtained by performed motion compensation prediction to the other plane and/or planes on the basis of the motion information;

first orthogonal transformation means for outputting transformed image data obtained by performing an orthogonal transformation in a time direction with respect to the plurality of planes on the basis of image data of the reference plane and the predictive image data; and second orthogonal transformation means for performing an orthogonal transformation in a screen with respect to data outputted from said first orthogonal transformation means.

2. The decompression system and/or compression/decompression system according to claim 1, for image data and which receive or receives output data outputted from the compression system and/or compression/decompression system, comprising decoding means for decoding the transformed image data and the motion information from the output image data;

motion prediction means for performing a motion compensation prediction to predetermined image data in the transformed image data on the basis of the motion information; and inverse orthogonal transformation means for performing an inverse orthogonal transformation in the time direction with respect to the plurality of planes on the basis of output image data of the motion prediction means and the other image data in the transformed image data.

3. A compression system and/or compression/decompression system for image data, which perform or performs an orthogonal transformation in a time direction with respect to each of predetermined blocks divided from a plane with performing a motion compensation prediction, comprising motion estimation means for obtaining motion information with respect to each of the predetermined blocks from the other plane and/or planes, motion prediction means for outputting predictive image data obtained by performed motion compensation prediction each of the blocks on the basis of the motion information;

first orthogonal transformation means for outputting transformed image data obtained by performing an orthogonal transformation in a time direction with respect to each of the blocks on the basis of image data of the reference plane and the predictive image data;

second orthogonal transformation means for performing an orthogonal transformation in the plane with respect to data outputted from said first orthogonal transformation means; and feed back means for feeding back data in the manner that a portion of the transformed image data is fed back to an input of the motion prediction means with respect to each of the blocks.

4. The decompression system and/or compression/decompression system according to claim 3, for image data and which receive or receives output image data outputted from the compression system and/or compression/decompression system immediately mentioned above, comprising first inverse orthogonal transformation means for performing an inverse orthogonal transformation in a screen with respect to said output image data outputted from said compression system and/or decompression system;

decoding means for decoding the transformed image data and the motion information from the output image data;

motion prediction means for performing a motion compensation prediction to predetermined image data in the transformed image data on the basis of the motion information;

second inverse orthogonal transformation means for performing an inverse orthogonal transformation in the time direction with respect to each of the blocks on the basis of output image data of the motion prediction means and the other image data in the transformed image data; and feed back means for causing a portion of the image data to be fed back to an input of the motion prediction means in the inverse order at compression with respect to each of the blocks.

5. The decompression system and/or compression/decompression system according to claim 4, wherein said second inverse orthogonal transformation means is comprised of inverse Hadamard transformation means for performing an inverse Hadamard transformation in the time direction.

6. The compression system and/or compression/decompression system according to claim 1, wherein said first orthogonal transformation means performs a Hadamard transformation in the time direction.

7. The compression system and/or compression/decompression system according to claim 3, wherein said first orthogonal transformation means performs a Hadamard transformation in the time direction.

* * * * *